Patented June 14, 1938

2,120,934

UNITED STATES PATENT OFFICE 2,120,934

PROCESS FOR MAKING PLASTIC COMPOSITIONS

Frazier Groff, Lakewood, Ohio, assignor to Carbide and Carbon Chemicals Corporation, a corporation of New York No Drawing. Application July 1, 1936,
Serial No. 88,404

17 Claims. (Cl. 106—22)

Plastic compositions of various types in which resins or cellulose derivatives are colloided with high-boiling solvents, or plasticizers, are well known. In the production of such compositions, it is customary to assist the combination of the materials by employing such physical aids as heat, pressure, mechanical working, and combinations of these, or to use chemical aids, such as mutual solvents which subsequently are eliminated.

This invention is concerned with the formation of plastic compositions essentially composed of partial polyvinyl acetal resins colloided with ester plasticizers, and the principal object of the invention is to provide an efficient process for making these compositions simply and economically.

The partial polyvinyl acetal resins with which this invention is concerned are not soluble in ester plasticizers at ordinary temperatures, but these resins themselves have the property of dissolving sufficient quantities of ester plasticizers to yield adequately softened compositions. These compositions are characterized by remarkable qualities of elasticity and resiliency coupled with great strength and toughness. In appearance, the compositions are clear and colorless, and the combination of the resin with the plasticizer is so nearly permanent as to render them extremely valuable where lasting qualities of strength and elasticity over a wide range of temperatures are desired. A typical application of these plastic compositions is in the formation of laminated non-shattering glass, wherein a reinforcing plastic material of high strength, extreme clarity, good adhesion and permanent resiliency is of greatest importance.

Partial polyvinyl acetal resins are those such as may result from the incomplete condensation of aldehydes with polyvinyl alcohol, and which contain in the polymeric aggregate both acetal groups and free alcoholic hydroxyl groups. The degree to which the hydroxyl groups of the polyvinyl macromolecule have been combined with aldehyde may be indicated directly as percent (%) acetalization. A number of methods have been proposed for making partial polyvinyl acetal resins, and the process of this invention is applicable to the formation of plastic compositions from these resins however they are produced.

The object of this invention may be accomplished, and highly useful compositions of the type described may be readily prepared, by introducing the ester plasticizer into the partial polyvinyl acetal resins by the aid of water. I have discovered that water is capable of wetting or swelling the resins, and enables them to be quickly and uniformly penetrated by the plasticizer, and that the water may be subsequently removed from the other constituents of the composition to yield clear and homogeneously colloided combinations of resin and plasticizer. It is generally preferable to add the water to the resin before the plasticizer is introduced, although the water may be added simultaneously with or subsequent to the introduction of the plasticizer. When the addition of plasticizer to the resin follows that of water, it will be found that the plasticizer tends to displace a certain amount of the water which can be readily removed by decantation. The entire mass may be mechanically worked to facilitate the formation of a homogeneous composition, followed by elimination of the remaining water from the mixture by various means. Heat may be applied during the mixing operation which will result in volatilization of the water simultaneously with the union of plasticizer with resin. The mixing operation may be carried out by the usual methods of resin compounding, such as those involving differential roll mills or kneading and mixing machines.

The present invention is not applicable to polyvinyl acetal resins which are completely acetalized, or nearly so, and it may not be applied with best results to every partial polyvinyl acetal resin. Those resins which are best adapted for use in the process of the invention are prepared from polyvinyl alcohol (or polyvinyl esters which give rise to the latter) of a molecular weight in excess of about 10,000, and those resins which have their origin in polyvinyl acetate having an average molecular weight of at least 25,000 are preferred. (Molecular weights referred to herein are calculated by means of Staudinger's formula from viscosity determinations on solutions of the materials.) The suitability of a given resin of this type is determined by two additional factors, the more important of which is the degree of acetalization, and of nearly equal importance is the nature of the aldehyde from which it is made. In general, the resins useful in the process of this invention are those acetalized between about 35% and about 90%, and the aldehydes from which the most desirable resins are made are those of the aliphatic series containing from two to six carbon atoms. Preferably, the aldehyde is saturated and straight-chained in structure, and of the aldehydes of this type, butyraldehyde, propionaldehyde and valeraldehyde are specifically preferred in the order given. The optimum degrees of acetalization which have been determined for resins for use in the process of this invention are from about 88% to 94% with acetaldehyde; from about 62% to 88% with propionaldehyde; from about 54% to 78% with butyraldehyde; and from about 39% to 58% with valeraldehyde.

The solubility characteristics of the partial polyvinyl acetal resins of this group are somewhat unusual. For example, these resins are soluble in the lower aliphatic alcohols, glycol ethers, and in water-soluble organic liquids generally, but they are not soluble in water, nor in water-insoluble organic solvents including the ester plasticizers and the more volatile esters, such as ethyl and butyl acetates; the ketones, such as acetone; aliphatic or aromatic hydrocarbons and chlorinated hydrocarbons, such as pentane, hexane, benzene, toluene, chlorobenzene, chloroform and methylene chloride. All of the foregoing solubility characteristics refer to ordinary temperatures, while at increased temperatures the solubility of these resins in such liquids as the esters becomes greater. The resins, however, are in no case soluble in water.

It is preferred to carry out the process of this invention by adding water to a mass of the resin in finely divided form, followed by addition of the required amount of plasticizer after the mass has been thoroughly wetted by the water. This mixture may then be mixed and heated in a dough-type mixing machine until it becomes homogeneous, and a large part of the water has been evaporated. Final elimination of water may be carried out by heating the mass on a differential roll mill, or by heat alone.

The ester plasticizers to which the process of this invention may be applied are those which are water-insoluble, and these may include phthalates of the glycols and glycol ethers, and of the lower alcohols. The corresponding esters of tartaric, succinic, and related acids also may be used, and the esters which are specifically preferred in the practice of this invention are the hexoic acid esters of the polyethylene glycols. Examples of specific plasticizers which may be used are, diethyl and dibutyl phthalates, dibutyl tartrate, dichlorethyl phthalate, di(beta-butoxyethyl) phthalate, and the dihexoates of di-, tri-, tetra- and pentaethylene glycols. It is preferred to employ di(2-ethyl butyrates) or di(2-methyl pentoates) of diethylene or triethylene glycols.

The most usual methods employed for the preparation of partial polyvinyl acetal resins result in the formation of a solution of the resin. It is customary to recover the resin from the solution, and to prepare it in dry form, by precipitating it through the addition of water to the solution. The precipitated resin is a heavy, dough-like mass, which may be separated from the bulk of the precipitant (water) and solvent by decantation. The resin may then be filtered or otherwise treated as is desired, but the final operation, in any case, involves drying it to separate it from the water used in the precipitating operation. Since water is used as an adjuvant in the practice of this invention, the resin as discharged from the process, but before it has been dried, may be compounded with plasticizers by means of this process. This use of the water-wet resin makes possible the preparation of these plastic compositions rapidly and economically.

The quantity of water required in carrying out this process may vary greatly. Roughly, equal parts by weight of water and resin are preferred, and these relative proportions have proved to be wholly satisfactory in permitting the process to be conducted rapidly, efficiently and economically. In general, the quantity of water used should be at least equal to 20% by weight of the resin, and quantities of water greater than 200% by weight of the resin are superfluous and undesirable.

The following examples will serve to illustrate the practice of this invention:

*Example I*

A batch of partial polyvinyl acetal resin which was about 67% acetalized with butyraldehyde was taken from the final precipitation stage of the process by which it was made, and in which state it was found to contain 53% by weight of solids, the balance being water. To 13 parts by weight of this wet resin were added 3.1 parts by weight of triethylene glycol di(2-ethyl butyrate) while the wet mass was being mixed in a dough-type mixer. The rotors and jacket of the mixer were heated internally by steam to a temperature of around 125° C. Within a few minutes, water began to separate from the mixture, and about three parts by weight of water were decanted. After about thirty minutes of mixing, during which time the temperature of the mass was gradually reduced, it became entirely clear, and cooling water was then passed through the rotors and jacket of the mixer. After a brief cooling period, the mass was removed from the mixer, and it was found to be entirely free from uncolloided resin particles. This composition was exceptionally bright and clear in appearance. Nearly all of the water was eliminated during the mixing operation, and the resin as removed from the mixer contained only about 1% of volatile material. It was found that the volatile material (largely residual water) could be entirely eliminated by conditioning the sheeted composition for two or three hours at a temperature of about 60° C. After this conditioning operation, a sheet of this composition, pressed between glass plates to form a nonshattering glass assembly, remained entirely clear and wholly free from bubbles when heated for one hundred twenty hours at 135° C.

*Example II*

A composition was prepared from the same quantities of the materials described in Example I, but in this instance additional water was added to the mass during the mixing operation to replace that being volatilized. As soon as the resin became clear in appearance, the addition of water was discontinued, and mixing was continued as previously described. This operation, like that of Example I, resulted in a clear and bright homogeneous composition entirely free from uncolloided resin particles.

*Example III*

A dry and finely divided partial polyvinyl acetal resin which was about 66% acetalized with butyraldehyde, was mixed with water in a covered dough-type mixer. The proportions used were 69 parts by weight of the resin and 70 parts by weight of water. After twenty minutes' mixing at a temperature of about 100° to 110° C., 31 parts by weight of triethylene glycol di(2-ethyl butyrate) were added, and mixing was continued with the mass open to the atmosphere. Approximately three minutes after the addition of the plasticizer, the mass had fluxed, and after thirty minutes, the bulk of the water had been evaporated and the resin was clear and free from lumps. The temperature was reduced, and mixing was continued for an additional ten minutes. At the end of this time, the mass was cooled, removed from the mixer and formed into sheets. In this case, as in the preceding examples, the composition was clear and bright and exhibited no uncolloided resin particles.

*Example IV*

Sixty-nine parts by weight of the partial polyvinyl acetal resin described in Example III, and 64 parts by weight of distilled water were heated at 90° to 100° C. for approximately twenty minutes in an open container. At the end of this time, 31 parts by weight of di(beta-butoxyethyl) phthalate were stirred into the mass, and the mixture was then covered. After standing overnight, this mass was placed on a differential roll mill, the rolls of which were heated internally with steam at a pressure of about 10 pounds per square inch. Fluxing of the mass was rapid, with the elimination of water, and after three or four minutes the composition was entirely clear and homogeneous.

*Example V*

A partial polyvinyl resin which was about 65% acetalized with butyraldehyde, was taken from the drying process at a point when the composition of the mass was about 83% of resin, the balance being water. This incompletely dried resin was mixed with additional distilled water in a covered dough-type mixer at 95° to 100° C. for fifteen minutes. The proportions of materials used were 83 parts by weight of the partly dried resin and 70 parts by weight of water. To this mixture was added 31 parts by weight of triethylene glycol di(2-ethyl butyrate), and mixing was continued with the rotors and jacket of the mixer heated by steam at a pressure of from 30 to 40 pounds per square inch. After about five minutes of mixing, the mass fluxed to form a granular dough. The cover was removed from the mixer, and mixing was continued for approximately thirty minutes. At the end of this time, the bulk of the water had evaporated and the mixture had begun to clarify. The temperature of the mass was reduced, and mixing continued until the composition was entirely clear and homogeneous, after which it was cooled and removed from the mixer. Sheets formed from this composition were found to be entirely clear and homogeneous, and after conditioning at 60° C. for a little more than an hour, the sheets were entirely free from tendencies to exhibit bubbles when laminated glass made from them was heated at 135° C.

In general, the process of this invention possesses many advantages over usual resin compounding operations which are carried out in the absence of water. The new process not only makes the compounding operation faster than in other methods, but the resulting composition is consistently homogeneous and light in color. The presence of water with the resin during the colloiding operation by its evaporation assists in controlling the temperature of the resin, and it likewise greatly retards dehydration which might otherwise tend to occur between the alcoholic hydroxy groups contained in the molecule of the resin. Compositions prepared by this process are remarkably free from entrapped gases, since air and other gases are displaced in the mass by the water employed.

The compositions made by this process may, of course, contain various proportions of resin and plasticizer. This invention is capable of introducing any desired amount of plasticizer into the resin up to the greatest quantity with which the resin is capable of combining. For many purposes, particularly in making nonshattering glass, compositions made from the partial polyvinyl acetal resins in which the ester plasticizer constitutes from about 25% to about 50% by weight of the total are desirable, and, specifically, those compositions containing around 30% by weight of plasticizer are preferred for this use.

Modifications of the process described will be apparent to those skilled in the art, and such variations of the process are included within the scope of the invention as defined by the appended claims.

I claim:

1. Process for making clear and homogeneous plastic compositions essentially free of uncolloided particles, which comprises intimately mixing a water-insoluble partial polyvinyl acetal resin with a compatible ester plasticizer in which said resin is insoluble at ordinary temperatures, said mixing being carried out in the absence of a solvent for the resin and in the presence of water in sufficient quantity to wet and swell the resin.

2. Process for making clear and homogeneous plastic compositions essentially free of uncolloided particles, which comprises intimately mixing a water-insoluble partial polyvinyl acetal resin with a water-insoluble ester plasticizer in which said resin is insoluble at ordinary temperatures, said mixing being carried out in the absence of a solvent for the resin and in the presence of water in sufficient quantity to wet and swell the resin.

3. Process for making clear and homogeneous plastic compositions essentially free of uncolloided particles, which comprises intimately mixing a water-insoluble partial polyvinyl acetal resin with a compatible ester plasticizer in which said resin is insoluble at ordinary temperatures, said mixing being carried out in the absence of a solvent for the resin and in the presence of water in sufficient quantity to wet and swell the resin, and thereafter separating the water from the resin and plasticizer.

4. Process for making clear and homogeneous plastic compositions essentially free of uncolloided particles, which comprises intimately mixing a water-insoluble partial polyvinyl acetal resin with a water-insoluble ester plasticizer in which said resin is insoluble at ordinary temperatures, said mixing being carried out in the absence of a solvent for the resin and in the presence of water in sufficient quantity to wet and swell the resin, and thereafter separating the water from the resin and plasticizer.

5. Process for making clear and homogeneous plastic compositions essentially free of uncolloided particles, which comprises intimately mixing a water-insoluble partial polyvinyl acetal resin with a compatible ester plasticizer in which said resin is insoluble at ordinary temperatures, said mixing being carried out in the absence of a solvent for the resin and in the presence of water in sufficient quantity to wet and swell the resin, and thereafter separating the water by evaporation from the resin and plasticizer.

6. Process for making clear and homogeneous plastic compositions essentially free of uncolloided particles, which comprises intimately mixing a water-insoluble partial polyvinyl acetal resin with a water-insoluble ester plasticizer in which said resin is insoluble at ordinary temperatures, said mixing being carried out in the absence of a solvent for the resin and by the aid of water in sufficient quantity to wet and swell the resin, and thereafter separating the water by evaporation from the resin and plasticizer.

7. Process for making clear and homogeneous plastic compositions essentially free of uncolloided particles, in which a partial polyvinyl acetal resin acetalized between about 35% and 90% is intimately mixed with a water-insoluble ester plasticizer, which comprises combining the resin and ester in the absence of a solvent for the resin and by the aid of a sufficient quantity of water to wet and swell the resin.

8. Process for intimately mixing a water-insoluble partial polyvinyl acetal resin with an ester plasticizer in the absence of a solvent for the resin to form a clear and homogeneous plastic composition essentially free of uncolloided particles, which comprises adding to the resin a sufficient quantity of water to wet and swell the resin, introducing a compatible ester plasticizer in which said resin is insoluble at ordinary temperatures into the mixture of resin and water, and thereafter separating the water from the resin and plasticizer.

9. Process for intimately mixing a water-insoluble partial polyvinyl acetal resin with ester plasticizer in the absence of a solvent for the resin to form a clear and homogeneous plastic composition essentially free of uncolloided particles, which comprises introducing a compatible ester plasticizer in which said resin is insoluble at ordinary temperatures into a mixture containing the resin and a sufficient quantity of water to wet and swell the resin, and thereafter eliminating the water.

10. Process for intimately mixing a partial polyvinyl acetal resin substantially identical with the resin derived from polyvinyl alcohol of a molecular weight above about 10,000 and acetalized with one of the group consisting of acetaldehyde from about 88% to 94%, propionaldehyde from about 62% to about 88%, butyraldehyde from about 54% to about 78%, and valeraldehyde from about 39% to about 58% with ester plasticizer in the absence of solvent for the resin to form a clear and homogeneous plastic composition essentially free of uncolloided particles, which comprises introducing a water-insoluble ester plasticizer in which said resin is insoluble at ordinary temperatures into a mixture containing said resin and a sufficient quantity of water to wet and swell the resin.

11. Process for intimately mixing a partial polyvinyl acetal resin substantially identical with the resin derived from polyvinyl alcohol of a molecular weight above about 10,000 and acetalized with one of the group consisting of acetaldehyde from about 88% to about 94%, propionaldehyde from about 62% to about 88%, butyraldehyde from about 54% to about 78%, and valeraldehyde from about 39% to about 58% with a polyethylene glycol dihexoate in the absence of a solvent for the resin to form a clear and homogeneous plastic composition essentially free of uncolloided particles, which comprises introducing said polyethylene glycol dihexoate into a mixture containing said resin and a sufficient quantity of water to wet and swell the resin.

12. In a process for making clear and homogeneous plastic compositions essentially free of uncolloided particles in which a partial polyvinyl acetal resin acetalized between about 54% and about 78% with butyraldehyde is intimately mixed with a polyethylene glycol hexoate in the absence of a solvent for the resin, the step which comprises introducing said hexoate into said resin by the aid of a sufficient quantity of water to wet and swell the resin to facilitate penetration of the hexoate into the resin.

13. In a process for making clear and homogeneous plastic compositions essentially free of uncolloided particles in which a partial polyvinyl acetal resin acetalized between about 54% and about 78% with butyraldehyde is intimately mixed with a polyethylene glycol hexoate in the absence of a solvent for the resin, the step which comprises introducing said hexoate into a mixture of said resin with a sufficient quantity of water to wet and swell the resin.

14. Process for making clear and homogeneous plastic compositions essentially free of uncolloided particles, which comprises intimately mixing a water-insoluble partial polyvinyl acetal resin with triethylene glycol dihexoate, said resin being insoluble in said triethylene glycol dihexoate at ordinary temperatures, said mixing being carried out in the absence of a solvent for the resin and by the aid of a sufficient quantity of water to wet and swell the resin.

15. Process for intimately mixing water-insoluble partial polyvinyl acetal resins with water-insoluble ester plasticizers in which said resins are insoluble at ordinary temperatures to form clear and homogeneous plastic compositions essentially free of uncolloided particles, which comprises introducing the plasticizer into a mixture of the resin with approximately an equal weight of water and in the absence of a solvent for the resin.

16. Process for making clear and homogeneous plastic compositions essentially free of uncolloided particles in which a partial polyvinyl acetal resin acetalized from about 54% to about 78% with butyraldehyde is intimately mixed with triethylene glycol di(2-ethyl butyrate) in the absence of solvent for the resin, which comprises introducing the plasticizer into a mixture containing said resin and approximately an equal weight of water, and thereafter eliminating the water by evaporation.

17. Process for making clear and homogeneous plastic compositions essentially free of uncolloided particles in which a partial polyvinyl acetal resin acetalized about 66% with butyraldehyde is intimately mixed with triethylene glycol di(2-ethyl butyrate) in the absence of solvent for the resin, which comprises introducing the plasticizer into a mixture containing said resin and approximately an equal weight of water, and thereafter eliminating the water by evaporation.

FRAZIER GROFF.